June 16, 1953     F. KRIZE, JR     2,641,943
BOTTLE SCREW CAP REMOVER
Filed Feb. 2, 1951
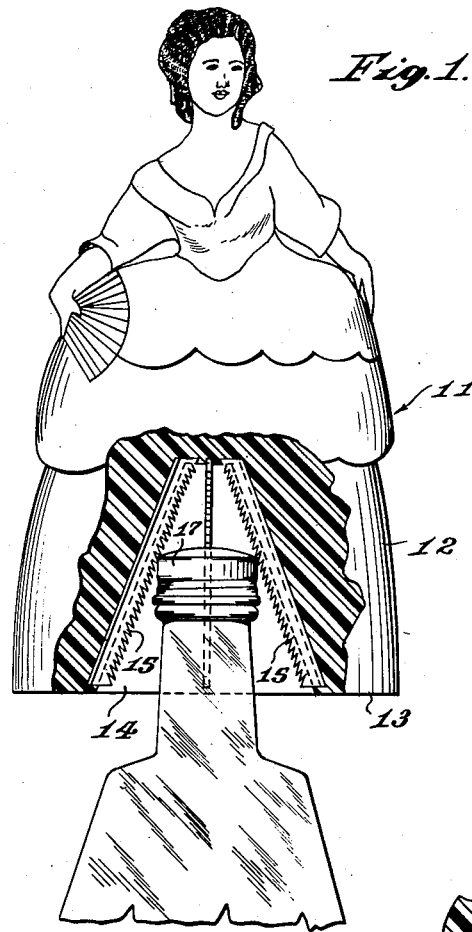
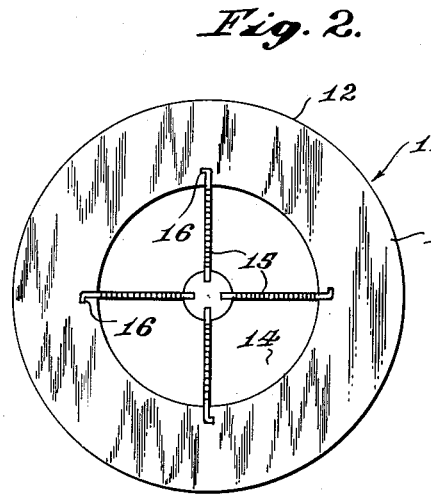
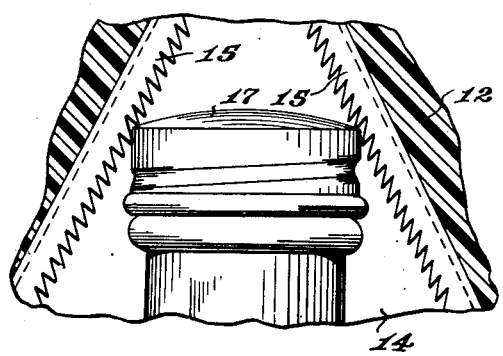
INVENTOR.
FRANK KRIZE, JR.
BY
McMorrow, Berman & Davidson
ATTORNEYS Patented June 16, 1953

2,641,943

UNITED STATES PATENT OFFICE 2,641,943

BOTTLE SCREW CAP REMOVER

Frank Krize, Jr., Natchez, Miss.

Application February 2, 1951, Serial No. 209,115

1 Claim. (Cl. 81—3.4)

This invention relates to bottle openers, and more particularly to an improved bottle screw cap remover.

A main object of the invention is to provide a novel and improved screw cap remover for bottles which is simple in construction, which is easy to operate, and which is neat in appearance.

A further object of the invention is to provide an improved bottle screw cap remover which is inexpensive to manufacture, which is rugged in construction, and which may be employed with a wide range of different sizes of bottle screw caps.

Further objects and advantages of the invention will become apparent from the following description and claim, and from the accompanying drawings, wherein:

Figure 1 is a front elevational view, partly in cross-section, of an improved bottle screw cap remover constructed in accordance with the present invention;

Figure 2 is a bottom plan view of the bottle screw cap remover of Figure 1;

Figure 3 is an enlarged fragmentary, cross-sectional, detail view taken vertically through the improved bottle screw cap remover of Figures 1 and 2, showing the manner in which the gripping elements of the screw cap remover engage a typical bottle screw cap.

Referring to the drawings, the improved bottle screw cap remover is designated generally at 11, and may comprise a body 12 formed of any suitable material, such as plastic material or any other suitable moldable material, said body being formed in any desirable decorative shape, as for example, in the form of a female figure, as shown in Figure 1. The body 12 has a flat bottom 13 which is formed centrally thereof with a conical recess 14, and embedded or otherwise suitably fastened in the walls of the recess 14 are a plurality of straight, serrated blades or ribs 15. The straight blades or ribs 15 may comprise sections of conventional saw blades, embedded in the walls of the recess 14 and arranged in uniformly spaced relationship around the axis of the recess, as shown in Figure 2. The embedded margins of the blades 15 are preferably formed with anchoring flanges 16 to strengthen the securement of the blades in the material of the body 12. As shown in Figures 1 and 3, the teeth of the blades 15 are arranged to face inwardly and downwardly in the recess 14. As shown in Figure 2, there may be four blades 15 arranged at 90-degree angular spacings around the axis of the recess 14. Obviously, any other desired number of blades may be employed.

In using the device, the body 12 is placed over the cap of a bottle to be removed, such as the cap 17, the cap being received in the recess 14 and being engaged by the teeth of the blades 15. By exerting a slight downward pressure on the body 12, the blade teeth will become firmly interlocked with the top peripheral edge of the cap 17. By exerting a twist on the body 12, the cap 17 may be loosened, the bottle being held in one hand and the body 12 being held in the other hand, whereby torque may be effectively transmitted from the body 12 to the bottle cap 17. It will be readily apparent that due to the conical shape of the recess 14, the device may be employed to remove a wide range of different sizes of screw caps, since the conical configuration of the recess 14 allows the device to be placed over any screw cap which may be received in recess 14.

While a specific embodiment of an improved bottle screw cap remover has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A bottle screw cap remover comprising a body of solid material shaped in the form of a human figure, said body having a flat bottom and formed with a generally conical recess opening at said bottom, and a plurality of equally spaced, relatively thin, straight saw blades embedded and rigidly secured in the wall of said recess and extending along the surface thereof with the serrated edges of the blades exposed and facing inwardly in said recess, laterally extending flanges formed on the embedded edges of said blades, the serrations on said exposed edges facing downwardly and inwardly in the recess, defining gripping elements engageable with a bottle screw cap when the body is placed over a cap to be removed.

FRANK KRIZE, Jr.

References Cited in the file of this patent

UNITED STATES PATENTS

| Number | Name | Date |
|---|---|---|
| 1,662,936 | Philipp | Mar. 20, 1928 |
| 1,752,189 | Lotz | Mar. 25, 1930 |
| 1,960,531 | Driscoll | May 29, 1934 |
| 2,431,550 | Gary | Nov. 25, 1947 |
| 2,589,693 | Hess | Mar. 18, 1952 |

FOREIGN PATENTS

| Number | Country | Date |
|---|---|---|
| 808 | Great Britain | Jan. 13, 1893 |
| 97,945 | Sweden | Jan. 30, 1940 |